United States Patent [19]

Braeunig

[11] Patent Number: 4,925,189
[45] Date of Patent: May 15, 1990

[54] BODY-MOUNTED VIDEO GAME EXERCISE DEVICE

[76] Inventor: Thomas F. Braeunig, 1805 Pilgrim St., S.E., Salem, Oreg. 97302

[21] Appl. No.: 296,705

[22] Filed: Jan. 13, 1989

[51] Int. Cl.⁵ .................. A63B 71/00; A63B 23/00; G09G 3/02

[52] U.S. Cl. .................................. 273/148 B; 272/94; 340/709

[58] Field of Search ........ 273/148 B, 85 G, DIG. 28; 200/6 A; 340/825.19, 709; 272/143, 96, 67, 93, 94

[56] References Cited

U.S. PATENT DOCUMENTS

| | | | |
|---|---|---|---|
| 4,488,017 | 12/1984 | Lee | 273/148 B |
| 4,489,938 | 12/1984 | Darzinskis | 272/142 |
| 4,558,864 | 12/1985 | Medwedeff | 273/148 B |
| 4,567,479 | 1/1986 | Boyd | 340/709 |
| 4,630,817 | 12/1986 | Buckley | 272/73 |
| 4,637,605 | 1/1987 | Ritchie | 272/73 |
| 4,660,828 | 4/1987 | Weiss | 272/138 |
| 4,674,741 | 6/1987 | Pasierb, Jr. et al. | 272/72 |
| 4,682,159 | 7/1987 | Davison | 340/709 |
| 4,720,789 | 1/1988 | Hector et al. | 272/96 |
| 4,721,308 | 1/1988 | Trimble | 272/67 |
| 4,817,950 | 4/1989 | Goo | 273/148 B |

Primary Examiner—Edward M. Coven
Assistant Examiner—Gary Jackson

[57] ABSTRACT

A video game controller which attaches to the user's upper body allowing the user to play a video game by leaning the upper body in any direction, simulating the movement of a joystick. The controller attaches to the user's upper back with an arrangement of straps and buckles. The tilt of the user's upper body is detected by an array of mercury switches with the resultant electrical signals being transmitted to the input of a video game. The specific angle of tilt required to actuate the mercury switches can be adjustable, thereby varying the degree of upper body movement needed to play a particular video game. Additional controls for the video game, such as a firing control, are provided by a hand held pushbutton attached to the controller via a flexible cord. Playing a video game using this arrangement results in vigorous exercise of the abdominal, back and lateral muscles.

8 Claims, 2 Drawing Sheets

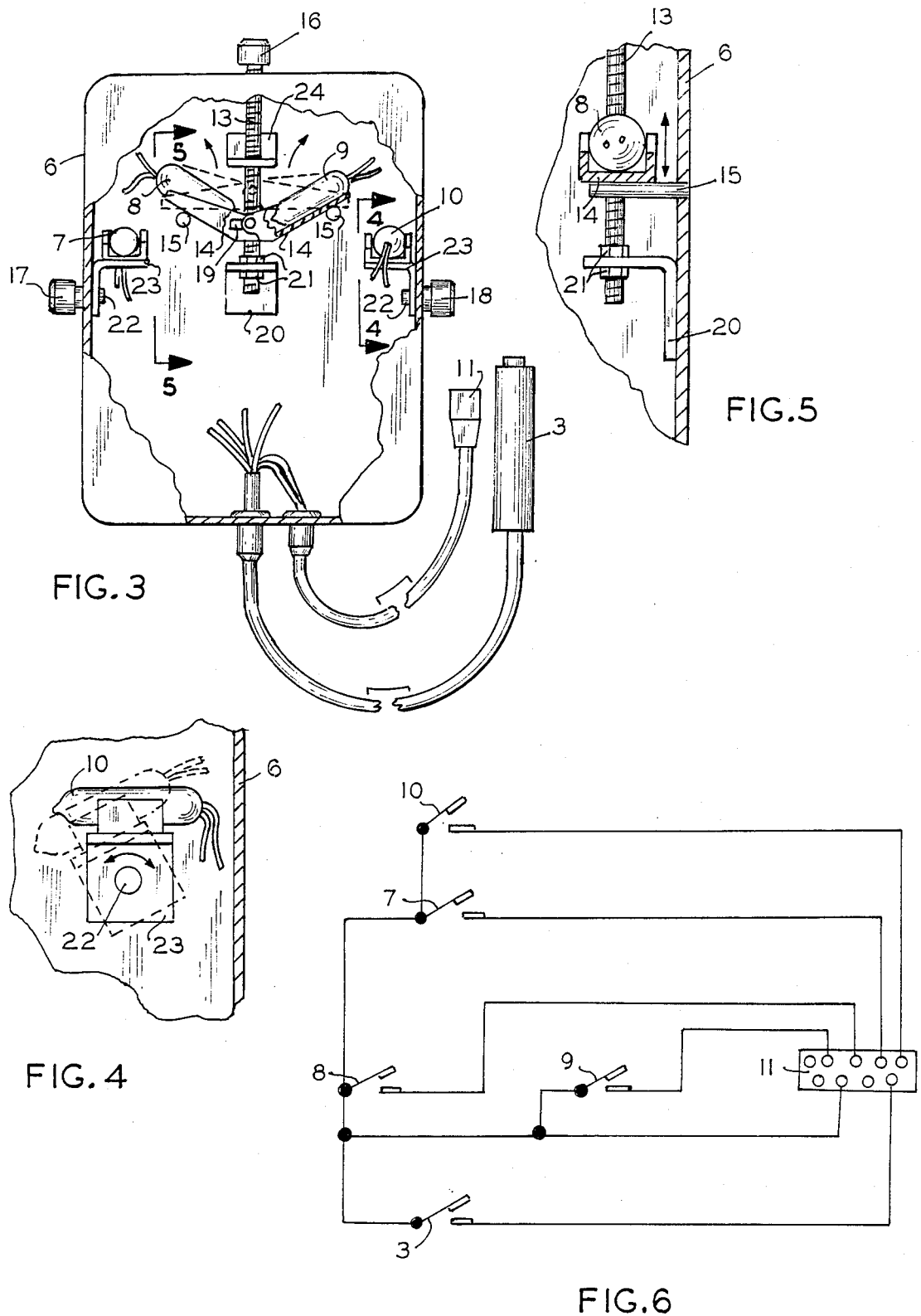

BODY-MOUNTED VIDEO GAME EXERCISE DEVICE

BACKGROUND

1. Technical Field of the Invention

This invention relates to exercise devices using video displays, and in particular to those which require physical exertion to operate the controls of a video game.

2. Background and Purpose of Invention

The benefits of regular physical exercise have been well established over the past several years; however, maintaining a regular exercise program requires a great deal of self-discipline and determination. This invention addresses that problem by providing an exercise method that is both fun and challenging, and therefore, self-motivating.

To fully appreciate the purpose and spirit of this invention, one only has to watch the expressions on the face of a person playing a challenging video game to see the intense concentration and total involvement. Now compare this with the somewhat bored or pained expression of someone who is doing calisthenics or a routine of bending and stretching exercises. This invention effectively combines these two activities, transforming the otherwise tedious exercise routine into an intense and challenging game.

Prior Art

Several previous inventions have combined video game controllers with exercise apparatus:

Buckley described a stationary exercise device, U.S. Pat. No. 4630817, in which the operator was seated, and operated a moveable control rod against a resistance in two degrees of movement to control a video game. This arrangement lacked portability and did not specifically provide exercise of the abdominal muscles. It also did not truly simulate the movement of a joystick.

Trimble described a thumb-twiddle operated video game controller, U.S. Pat. No. 4721308, which sensed the speed of the user's thumb twiddling to control vertical movement on the video screen, and utilized a tilt-sensing means to control horizontal movement. This was strictly a handheld device which did not require any large muscle exertion to operate.

Phillips, U.S. Pat. No. 4512567, and Ritchie, U.S. Pat. No. 4637605, both describe exercise bicycles combined with video game controls. Both devices lack portability, and neither of them simulates the physical movement of a joystick. Darzinskis discloses an elastomeric exercise device, U.S. Pat. No. 4489938, combined with a video game control. It does not require muscular exertion to operate the directional joystick controls, but only to operate the 'fire' button.

Hector, Bushnell, Delman, Rotberg and Kinsting describe a foot operated video game exercise system, U.S. Pat. No. 4720789. It is a single-game system, not adaptable to commercially-available video games and also lacks portability.

Medwedeff disclosed a handgrip exerciser adapted to control a video game, U.S. Pat. No. 4558864. It provided exercise only for the hand, and did not simulate the action of a joystick.

Pasierb, Nieto, Andrus, Kolomayets, Oglesby and Ryan describe a rowing machine with a video display, U.S. Pat. No. 4674741. This device provides an image of a pace boat on the video screen along with a representation of the user's boat. The user can set a predetermined speed for the pace boat and then row at a rate to keep up with the pace boat. This arrangement does not adapt to various video games and also is not portable.

SUMMARY

The object of this invention is to provide an exercise device consisting of a tilt-detecting means which is worn on or attaches to the user's upper body via an attachment means. The attachment means is such that the tilt-detecting means can be securely attached to the upper part of the user's torso in such a way as to maintain alignment with the upper torso even during vigorous exercise. The tilt-detecting means responds to tilt in either of two axes; fore-and-aft, and side-to-side, or a combination thereof; by providing the appropriate electrical signals to the joystick input of a video game. These electrical signals are the same as those which would be provided by a joystick controller being moved in a corresponding direction. The degree of tilt necessary for the tilt-detecting means to provide a given signal may either be fixed or user-adjustable.

A further object of this invention is to provide an additional control means to enable the user to manipulate any additional controls needed to operate the video game. These would include the 'fire' button or shooting control used with some video games. The additional control means would consist of a handheld, manually-operated control containing the necessary pushbuttons and/or switches to provide control signals to the video game. The control signals provided by the handheld control would be identical to those from the buttons and switches normally associated with or mounted on a joystick control. The handheld control would connect electrically to the video game through a flexible cord of sufficient length to allow the user to hold it comfortably while playing the video game.

The results of this arrangement are such that a person would be able to play any of the large variety of commercially-available, joystick-controlled video games by simply leaning the upper body in the direction desired to move the players or objects on the video screen and manipulating the handheld control as needed to control additional functions of the video game. The user may play from a standing, sitting or kneeling position; or any position which places the upper body in an essentially vertical position and allows sufficient freedom of upper-body movement to adequately control player or object movement on the video screen.

It can be appreciated by anyone who has played or is familiar with video games, that playing a video game using this arrangement would involve extensive bending, stretching, and contraction of the lower abdominal, back and lateral muscles. The degree and intensity of exercise can vary depending on the video game being played, and on the predetermined degree of tilt required for the tilt-detecting means to produce the appropriate signal. Some of the currently available video games involve guiding a character through a two-dimensional maze. This would involve a relatively mild degree of exertion, while exercising nearly all of the abdominal and back muscle groups. There are also games which involve predominately side-to-side movement with little or no movement in the front-to-back direction. This would concentrate on stretching and contracting the lateral muscles. Finally, there are those games which simulate competitive sports such as basketball or ice-hockey. These games require very quick and precise movements in many directions in order to score effectively. The exercise provided by this type of game is intensive enough to provide an aerobic benefit as well as stretching and toning of the abdominal muscle groups. With most video games, there is a provision for multiple players to play at the same time. Multiple players, each using the exercise device, may play against each other or against a player using a conventional joystick. In this way, the competitive element is enhanced thereby increasing the intensity of the exercise.

It an be readily appreciated from the above description that by using this device, a person would be likely to exercise much longer and much more intensely than would be possible simply by doing traditional bending and stretching exercises.

BRIEF DESCRIPTION OF THE DRAWINGS

The above features and characteristics, as well as other advantages of the invention, will become better appreciated by referring to the detailed description of the preferred embodiment, and the referenced drawings as follows:

FIG. 3 is a front view of the exercise device with the front surface of the enclosure cut away to show the arrangement of mercury-bulb switches, mounting brackets and adjusting mechanisms which comprise the tilt-detecting means. Also shown are the flexible cord and plug which comprise the interface means; and the manually operated control which comprises the additional control means.

FIG. 4 is a detail view of the mercury bulb switch used for detecting forward tilt, with its associated mounting bracket, pivotally attached to the inside left surface of the enclosure.

FIG. 5 is side detail view showing one of the mercury-bulb switches used to detect sideways tilt, and detail of the adjusting mechanism used for changing the desired angle of sideways tilt.

FIG. 6 is a diagram of the electrical circuitry of the tilt-detecting means and additional control means, also showing the plug for interfacing to the video game.

DETAILED DESCRIPTION OF THE PREFERRED EMBODIMENT

Figure 1:
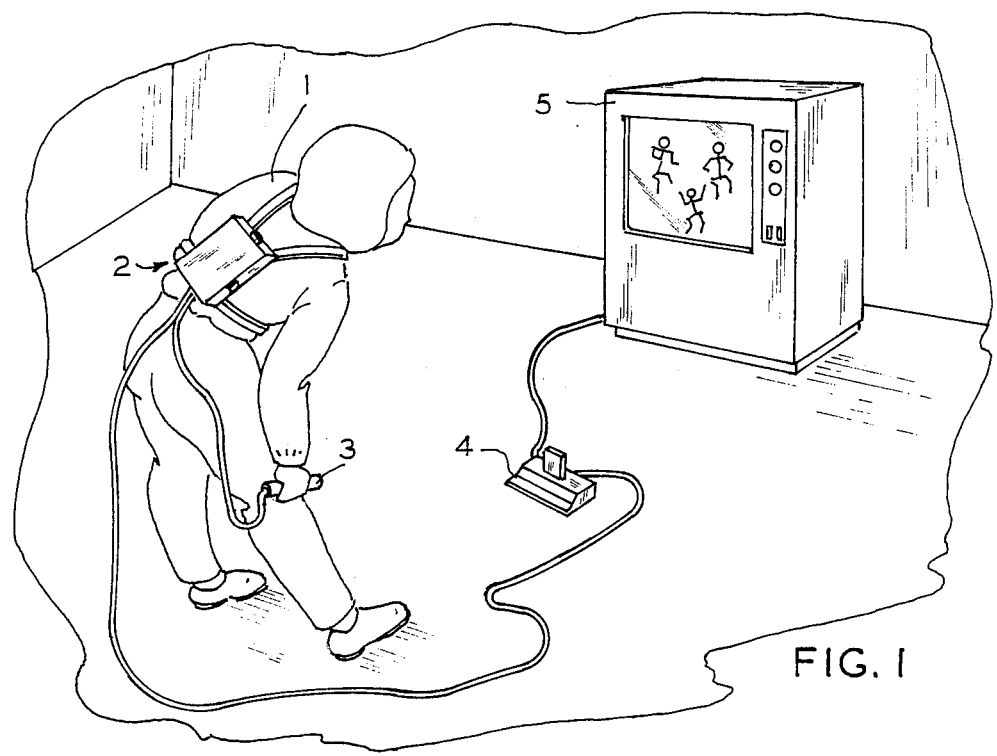
FIG. 1 is a perspective view of the complete exercise video-game playing arrangement according to the preferred embodiment.

FIG. 1 shows the complete video game playing arrangement with a single user. The user 1 is shown wearing the tilt-detecting device 2 strapped to the upper back by an arrangement of straps and adjustable buckles which comprise the attachment means. The hand-held pushbutton 3 comprises the additional control means and connects via a flexible cord through the tilt-detecting device 2 and, along with the tilt-detecting device, connects to the video game 4 through a flexible cord and connector. The video game connects to a standard television set 5 through the RF input. The video game and television depicted are well-known commercially-available products and not a part of the present invention.

Figure 2:
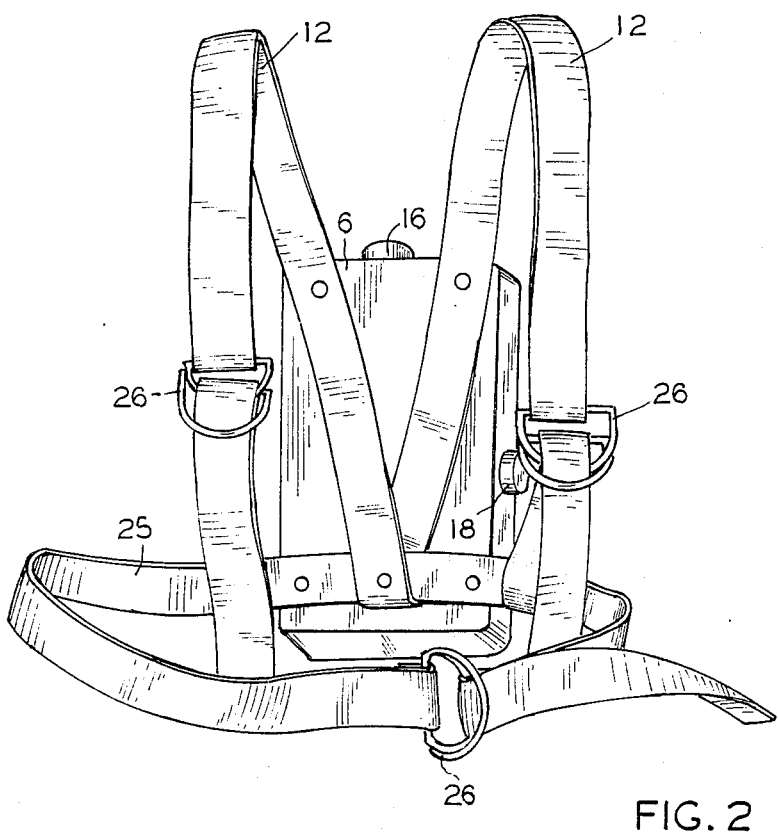
FIG. 2 is a front view of the invention showing the enclosure which houses the tilt-detecting means and the arrangement of straps and buckles which comprise the attachment means.

FIG. 2 is a front view of the invention showing the enclosure 6 which houses the tilt-detecting means; external knobs 16 and 18 for adjusting the desired angle of tilt; and the shoulder straps 12, waist strap 25 and adjustable buckles 26 which comprise the attachment means.

FIG. 3 shows a front cut-away view of the tilt-detecting means, the hand-held pushbutton 3 and attaching cord which comprise the additional control means, and the flexible cord and connector 11 which comprise the interface means. Mercury-bulb switch 7, used to detect rearward tilt, and 10, used to detect forward tilt, are shown mounted on brackets 23 pivotally attached to the left and right inside surfaces of the enclosure 6. Switch 7 has its contact end oriented toward the rear of enclosure 6, while switch 10 has its contact end oriented toward the front of enclosure 6. Two shafts 22, fixably coupled to the mounting brackets 23, extend through the side walls of the enclosure 6 and attach to the external knobs 17 and 18 to allow adjustment of the angle of the switches thereby varying the amount of tilt required to operate the mercury-bulb switches. The friction of the pivotally mounted brackets 23 against the enclosure wall is such that they can be adjusted using the external knobs but will remain stationary during operation. In practice, the minimum angle of switches 7 and 10 relative to enclosure 6 would be limited such that the mercury globules will always rest away from the contacts when the enclosure is in a vertical position. This simulates the centered position of a joystick. The two mercury-bulb switches 8 and 9 used to detect sideways tilt are shown mounted in two spring-loaded arms 14 pivotally attached to a threaded collar 19 which travels on a vertical threaded shaft 13 extending through the top of the enclosure 6 and fixably attached to an adjusting knob 16. The threaded shaft 13 extends through an upper bracket 24 and a lower bracket 20 which are mounted to the inside front surface of enclosure 6. The brackets 20 and 24 hold threaded shaft 13 in vertical alignment relative to enclosure 6 while allowing shaft 13 to rotate. Two collars 21, fixably attached to shaft 13, above and below the point where it passes through lower bracket 20, prevent vertical movement of the shaft as it is being rotated. The spring-loading of the switch-mounting arms 14 is such that the outer ends of the arms are held in a downward direction against two pins 15 which extend from and are rigidly attached to the inside front surface of enclosure 6. The upper bracket 24 also serves as a stop to limit the upward travel of threaded collar 19. With this arrangement, rotating the vertical threaded shaft 13 using the external adjusting knob 16 will cause threaded collar 19, pivotally attached to arms 14, to travel up or down along shaft 13 while the spring-loading holds the outer ends of arms 14 in contact with pins 15. Thus the angle of mercury-bulb switches 8 and 9 can be adjusted, within the limits imposed by the position of upper and lower brackets 24 and 20, varying the amount of tilt required to activate the switches. In practice, bracket 24 would be positioned so as to maintain a slight downward angle of the inner ends of switches 8 and 9 at the upper limit of travel of threaded collar 19 to ensure that the mercury globules would rest away from the contacts of switches 8 and 9 when the enclosure is in a vertical position. This would simulate the centered position of a joystick.

FIG. 4 shows a side detail view of mercury-bulb switch 10, used to detect forward tilt, and its associated mounting bracket 23 and pivot shaft 22. The approximate normal range of adjustment is depicted.

FIG. 5 is a side detail view showing one mercury-bulb switch 8, used to detect sideways tilt to the right; and the associated spring-loaded mounting arm 14, threaded shaft 13, one of the stationary pins 15 and lower bracket 20 which is fixably attached to the inside front surface of enclosure 6. Also shown are the two collars 21 used to prevent vertical movement of threaded shaft 13.

FIG. 6 shows the electrical circuitry consisting of the four mercury-bulb switches 7,8,9 and 10, the hand-held pushbutton switch 3, and the interconnecting wiring and plug 11 for interfacing to the video game.

In operation, a user, with this device attached to the upper body, when leaning or bending past a predetermined angle to the right, will cause the contacts of the right mercury switch 8 to close. This corresponds to a joystick being moved to the right. Similarly, the other mercury switches will close when the user leans or bends the upper body in their respective directions. It can be seen that a user with the tilt-detecting device attached to the upper body, in effect, becomes the joystick. The user, by leaning or bending the upper body in any direction, causes one or more of the mercury switches to close. With the upper body in a vertical position, all mercury switch contacts would be open, simulating the centered position of a joystick. The electrical signals provided to the video game by the tilt-detecting means are identical to those provided by the directional switches of a joystick. The signal provided by the additional control means is identical to that provided by the 'fire' button.

As will be readily apparent to those skilled in the art, the form of this invention could be altered without departing from its spirit or essential characteristics. For example, the attachment means could take various forms to suit the taste or requirements of various users. The electrical circuitry of the tilt-detecting means and additional control means could vary to match the electrical characteristics and specific control requirements of various video games while still keeping the characteristics of converting tilting action of the users body into corresponding video game control signals. Also, this invention could replace video game controllers which are not "joysticks" per se; for example, a particular video game controller may use individual pushbuttons or a multi-directional rocker switch to control the action on a video screen. This type of controller could be readily emulated by the tilt-detecting means of this invention.

Because of the many varying embodiments which could be made within the scope of this invention, it should be understood that the above detailed descriptions and drawings are meant to be illustrative and not restrictive. Accordingly, the full scope of this invention is defined in the appended claims.

I claim:

1. A combination video game control and exercise apparatus comprising:
   a. a tilt-detecting means with at least one electrical control element, where said control element is activated by tilt, and is capable of producing a control signal recognizable to a video game to control movement on a video screen;
   b. an interface means to transmit said control signal to said video game;
   c. an attachment means to attach said tilt-detecting means to a user's upper torso maintaining said electrical control element in a predetermined alignment and orientation with reference to said user's upper torso, whereby:
      said electrical control element will be activated by the tilt of said user's upper torso, producing a control signal depending upon said tilt of said user's upper torso.

2. A video game control and exercise apparatus according to claim 1 further comprising:
   d. at least one manually operated electrical control element which, when operated, produces a control signal recognizable to said video game for controlling additional game functions, and;
   e. an additional control interface means to transmit said control signal from said manually operated electrical control element to said video game.

3. A video game control and exercise apparatus according to claim 2 where said manually operated electrical control element comprises at least one hand-held momentary contact pushbutton switch.

4. A video game control and exercise apparatus according to claim 2 where said additional control interface means comprises at least one flexible cord of sufficient length to allow said user to hold and manipulate said manually operated electrical control element while playing said video game.

5. A video game control and exercise apparatus according to claim 1 where said alignment and orientation of said electrical control element is adjustable with reference to said user's upper torso, whereby:
   the degree of tilt of said user's upper torso necessary to activate said electrical control element is adjustable.

6. A video game control and exercise apparatus according to claim 1 where said electrical control element comprises at least one mercury switch.

7. A video game control and exercise apparatus according to claim 1 where said attachment means for attaching said tilt-detecting means, attaches to said user's upper back.

8. A video game control and exercise apparatus according to claim 7 where said attachment means comprises at least one flexible strap.

* * * * *